United States Patent [19]

Warncke et al.

[11] 4,146,025

[45] Mar. 27, 1979

[54] DEVICE FOR TESTING THE TIGHTNESS OF FIT OF GAS MASKS

[75] Inventors: Ernst Warncke; Karl-Heinz Huneke, both of Lübeck, Fed. Rep. of Germany

[73] Assignee: Dragerwerk Aktiengesellschaft, Fed. Rep. of Germany

[21] Appl. No.: 848,311

[22] Filed: Nov. 3, 1977

[30] Foreign Application Priority Data

Oct. 10, 1976 [DE] Fed. Rep. of Germany ....... 2651217

[51] Int. Cl.$^2$ .......... G01M 3/26

[52] U.S. Cl. .......... 128/142.4; 128/146.3; 128/142.7; 73/40; 73/40.7

[58] Field of Search .......... 128/140 R, 141 R, 142 R, 128/142.2, 142.3, 142.4, 142.5, 142.7, 145 R, 146 R, 146.3, 146.4, 146.5, 146.6, 146.7, 185, 195, 203, 202, 204, 205, 2 C, 1 R; 73/40 R, 40.5, 40.7

[56] References Cited

U.S. PATENT DOCUMENTS

| | | | |
|---|---|---|---|
| 2,420,372 | 5/1947 | Heidbrink | 73/40 |
| 2,449,053 | 9/1948 | Burns et al. | 73/40 |
| 2,738,669 | 3/1956 | Silverman et al. | 73/40 |
| 3,426,745 | 2/1969 | Farr | 128/2 C |
| 3,486,366 | 12/1969 | Jackson | 73/40 |
| 3,580,051 | 5/1971 | Blevins | 73/40 |

FOREIGN PATENT DOCUMENTS

| | | | |
|---|---|---|---|
| 539204 | 1/1931 | Fed. Rep. of Germany | 73/40 |
| 698045 | 10/1940 | Fed. Rep. of Germany | 73/40 |
| 1232474 | 1/1967 | Fed. Rep. of Germany | 73/40.7 |
| 1279474 | 10/1968 | Fed. Rep. of Germany | 73/40 |
| 2135751 | 2/1973 | Fed. Rep. of Germany | 73/40.7 |
| 889783 | 10/1943 | France | 128/142.4 |

*Primary Examiner*—Henry J. Recla
*Attorney, Agent, or Firm*—McGlew and Tuttle

[57] ABSTRACT

A device for testing the tightness of fit of a gas mask which has a tubular respiratory air inlet and a tubular exhaling air outlet, which is applied over the face of a wearer, comprises a bag-like headpiece which is engageable over the wearer's head and is preferably made of a transparent material, such as plastic, and which is provided with an opening for the wearer's neck and an opening for the tubular air inlet of the gas mask with a resilient rim for tightly engaging these parts when the headpiece is positioned on the wearer's head. The headpiece also includes a tubular exhaling air connection piece which is formed on the interior of the headpiece in a position to be engaged over the tubular exhaling air outlet of the gas mask. The connection piece includes an uptake passage for the passage of air directly from the mask outwardly through the passage. The passage may be connected, for example, to a measuring bag for collecting the gas for subsequent passage of the gas through a measuring tube to determine the quantities of testing gas which are present in the respiratory air. The measuring tube may also be placed directly in the uptake passage of the connection piece for the measuring of the leakage gas which is detected from the respiratory air flow from the gas mask.

7 Claims, 2 Drawing Figures

DEVICE FOR TESTING THE TIGHTNESS OF FIT OF GAS MASKS

FIELD AND BACKGROUND OF THE INVENTION

This invention relates in general to respirator masks and, in particular, to a new and useful testing apparatus for testing the tightness of fit of gas masks, comprising a headpiece which is filled with a test gas and includes an exhalation air connection to be coupled to the exhalation valve of the gas mask.

DESCRIPTION OF THE PRIOR ART

With respect to the effectiveness of respirators, the tightness of fit of gas masks is at least as important as their purely technical function. In practice, the effectiveness is limited rather by an insufficiently tight fit of the gas mask than by any functional failure or other possible leaks.

Tightness tests which give information about the fit of the applied gas mask under simulated conditions are carried out in gas chambers. In such a gas chamber, an atmosphere is created which contains a certain quantity of an irritant gas or aerosol or both. The irritant gases which are predominantly used include ammonia, vinyl bromomethane and ethanoic acid ester.

Aerosols are produced by the burning off of smoke shells ("stones") or blowing of dust, or by the atomization of corresponding substances. A gas mask is regarded as having a sufficiently tight fit if the wearer was unable to perceive the odor of the irritant. This constitutes a qualitative tightness test, the result of which moreover largely depends on the subjective sensitivity of the wearer. Through the gas chamber, the tightness test is restricted as to location, (Atemschutz-informationen 8 (1969), No. 2, pgs. 32–36).

Further testing apparatus for the testing of mask tightness permitting the quantitative detection of leakage of the applied gas mask is also known. The head of the mask wearer with the mask applied and the respirator connected thereto is exposed to a test medium of a certain concentration. The exhalation valve of the mask is coupled with an aerosol photometer, so that the exhaled air flows through the measuring device of the photometer into the atmosphere. For pressurization of the mask wearer's head and of the mask, these are covered with a headpiece into which the test aerosol is introduced at a given concentration. The test concentration is determined before the start of the measurement. The measured value is obtained from this concentration as a percentage of the aerosol which could penetrate into the interior of the mask during wearing of the mask through leakages, e.g., between the mask frame and the facial skin. To this end, the air exhaled through the exhalation valve, which is mixed with the aerosol depending on the size of the leak, is tested in the aerosol photometer for the magnitude of this proportion. Although the test space, namely, the headpiece can be obtained easily, the mask tightness test requires a relatively great expenditure for sensitive testing equipment. It is therefore not expedient to use this testing arrangement in connection with the fitting and the tightness testing of the gas masks necessary for that purpose. It simply is not enough study for such use, (Brandschutz-/Deutsche-Feuerwehrzeitung 8/1975, pgs. 238 to 245).

SUMMARY OF THE INVENTION

The present invention provides a testing device for testing the tightness of fit of gas masks, which can be employed directly for and after the fitting of gas masks to the actual wearer, e.g., in fire brigades, industrial plants and in mine rescue work, and which permits a testing of the tightness of the mask at any time, with no great expenses incurred.

According to the invention, the exhalation air connection traverses the material of the headpiece tightly relative to the exhalation valve and possesses a mount or annular bead which can be tightly fitted on the exhaling valve housing and includes an external uptake. A gas test tube is inserted into the uptake. For still more sensitive quantitative determination of the leakage, the gas testing tube is connected at its gas outlet side with a measuring bag.

The advantage obtained with the invention consist particularly in that the use of the known test tube process generally recognized for gas measuring permits a simple tightness test of the gas mask on the wearer, in any location. The headpiece and the gas test tubes are easy to transport and can be used at all times independent of an energy supply. The leaks or the tight fit of the gas masks are directly recognizable at the gas test tube from the length of the discoloration or the absence of discoloration. The scale on the gas test tube not only permits determining the limit value of a permissible leakage rate, but also provides a more accurate determination of the actual leakage rate.

Another advantageous possibility of determining the test gas proportion in the exhaled gas results with a measuring bag which is inserted directly into the uptake. In the test, the exhaled air is blown directly into the measuring bag. The appropriate gas test tube is then inserted in the removed measuring bag and, by means of a gas detection pump, the exhaled air is pumped out of the measuring bag through the gas test tube. The amount of leakage can then again be inferred from the discoloration length.

In accordance with the invention, the test gas comprises a breathable mixture with an addition of ethylene. The percentage of ethylene may be 2%. Ethylene is a known available gas. By selecting the 2% proportion, the minimum ignition limit of 217 vol. % is certainly not reached. Appropriate gas test tubes for ethylene are on the market.

For the advantageously simple connection of the respirator to the gas mask, the headpiece is provided with an opening which engages over a nipple of the respirator mask air inlet. Due to this design, a tight fit of the gas mask is also possible without the connection of the respiration in a normal atmosphere.

Accordingly, it is an object of the invention to provide a testing device for testing the tightness of a gas mask, which includes a head-enveloping bag, having a neck passage opening and an opening for the inlet of the gas mask which are rimmed with an elastic part to tightly engage over the head and the gas mask and which also includes a connection piece in the headpiece which is engageable over a tubular exhaling valve of the gas mask so as to collect the respiratory air directly from the gas mask after a testing gas is applied in the space between the bag-like headpiece and the wearer's head and the gas mask.

Another object of the invention is to provide a device for testing the tightness of a gas mask which includes means for applying a testing gas in a confined space around the wearer's head without interfering with the respiratory air inlet passage to the gas mask and for separately discharging the respiratory air from the gas mask so that it may be collected to measure the proportion of testing gas it contains.

A further object of the invention is to provide a gas mask testing device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figures 1, 2:
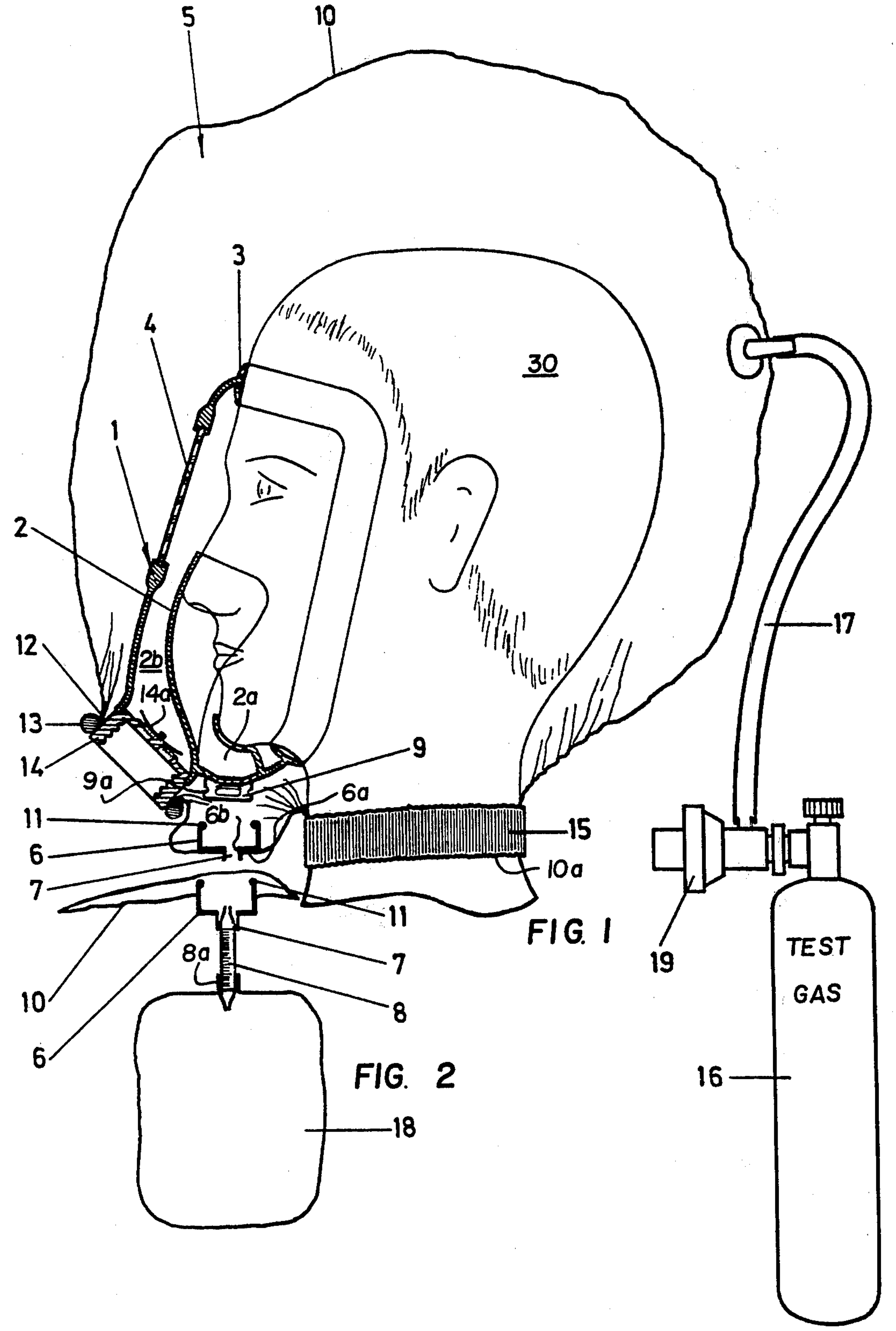
FIG. 1 is a partial elevational view of a person's head wearing a respiratory face mask and having a device for testing the tightness of fit of the face mask engaged thereover, constructed in accordance with the invention.
FIG. 2 is a partial elevational view showing a connection of the testing device to an indicator tube and measuring bag.

Referring to the drawing in particular, the invention embodied therein, comprises a device 5 which includes a transparent bag-like housing 10 of a plastic or similar material, having a first opening **10*a* bounded by an elastic cuff 15 for tight engagement over the neck of a wearer 30, and a second opening 12 which is bounded by a rubber ring 13 which tightly seals around an outlet nipple or tubular respiratory air inlet 14 of a gas mask, generally designated 1**.

Gas mask 1 is designed to apply tightly around the face of the wearer 30 by a sealing frame 3 and it includes an inner mask portion or liner 2 overlying the wearer's nose which separates a respiratory air passage **2*a* between the liner and the person's face and an inlet air passage 2*b* between the liner and the outside of the mask which has a window portion 4. The gas mask 1 includes, in addition to the tubular air inlet 14, having an inlet valve 14*a*, an exhaling air valve housing 9** of a tubular configuration.

Exhaling air valve housing 9 includes an annular recess **9*a* which may be engaged by an annular bead or mount 11 of an exhaling air connection 6 of the device 5. The exhaling air connection 6 is located between the opening 12 and the opening 10*a* and since the plastic material 10 is resilient, it may be pressed up into engagement with the valve housing 9 so that an uptake passage 11 which is defined in a bottom wall 6*a* provides a direct flow passage or access for the flow of exhaling air from the gas mask without passing in the space between the mask and the surrounding device 10**.

As shown in FIG. 1, tight adaptation of the mask 1 to the face of the wearer is possible without a respirator connection thereto at the tubular air inlet 14. Air supply with such operation then occurs by direct inhalation of the ambient atmosphere. To don the testing device 5, the cuff 15 may be stretched and pulled over the head and over the mask. Once the testing device 5 is in place, a test gas from a container 16, such as a gas bottle, is connected to flow into the space between the device 5 and the wearer's head 30 and the mask 1, through a connecting hose 17 under the regulation of a proportioning device or valve 19.

With the proportioning device 19, the test gas is proportioned into the headpiece 5 so as to provide an adequate testing of the possibility of leakage of this gas into the space between the gas mask 1 and the wearer's face. With the air connection 6 in place engaged on valve housing 9, the exhaling air will pass through the uptake 7 without passing into the space containing all of the test gas.

For the actual testing of the percentage of testing gas which penetrates into the breathing space, the exhaling air is either collected in a measuring bag 18 directly by engagement of a neck portion **8*a* of the bag 18 on a neck portion 6*b* of the air connection device or, as shown in FIG. 2, the exhaling air may be passed directly through a gas test tube 8 which is color-conditioned or similarly conditioned so as to give an adequate percentage or otherwise significant indication of the contents of the test gas in the exhaling air. FIG. 2 also shows an arrangement in which the gas leaving the uptake passage 7 passes through the gas test tube 8 and into the measuring bag 18**.

The operation of the device is as follows:

To test the tightness of the applied mask 1, testing device headpiece 10 is pulled over the wearer's head. At first the annular bead 11 is not engaged in the valve housing **9*a* until the first breaths are taken to ensure that the headpiece is flushed out. After a few minutes of respiration, the connection piece is engaged on the housing 9 so that the outer uptake passage 7 provides a passage for the outflow of the respiratory air without moving in the space between the headpiece 10 and the mask 1**.

After the interior of the headpiece is filled with the test gas, the gas can penetrate into the interior of the mask during respiration only if there are leaks at the seal frame 3 of the gas mask or the mask itself leaks. The test gas would then become mixed with the respiratory air drawn in through the inlet housing 14. As the exhaled air flows outwardly through the passage **2*a* and uptake 7, it may either be measured directly or collected in a measuring bag 18** and measured subsequently.

The gas test tube is such that a discoloration would occur as a function of the admixture of a quantity of the test gas from the container 16 with the respiratory exhaling gas. The length or extent of the discoloration in such cases is a measure of the leak of the gas mask.

The use of the measuring bag 18 with the gas tube 8 permits a further refinement of the test result, if desired.

While specific embodiments of the invention have been shown and described in detail to illustrate the application of the principles of the invention, it will be understood that the invention may be embodied otherwise, without departing from such principles.

What is claimed is:

1. A device for facilitating the testing of the tightness of fit of a gas mask to a wearer's face, comprising means for enveloping the wearer's face while permitting respiration through the gas mask from the exterior of said enveloping means, means for admitting a test gas into the space around the wearer's head and face exteriorly of the gas mask and means for directing the exhalation air from the wearer directly outwardly without passing in the space between the mask and the enveloping means for measuring the content of the testing gas in the exhaling air.

2. A device according to claim 1, including means for connecting a gas measuring tube to said directing means for the passage of the exhaling gas for measuring purposes.

3. A device according to claim 2, including a measuring bag, said measuring tube being open ended for the flow of gas therethrough and having one end connected to said directing means and the opposite end connected to said measuring bag.

4. A device according to claim 1, wherein said means for directing a test gas comprises an ethylene gas and means for circulating the ethylene gas into the space between said headpiece and the wearer.

5. A device according to claim 4, wherein the test gas is a breathable mixture of ethylene, the proportion of ethylene being 2% of the total.

6. A device according to claim 1, wherein said means on said headpiece for tightly engaging the respective neck and tubular air inlet includes an encircling cuff around the neck opening of an elastic material and an encircling rubber ring around the opening for said air inlet housing.

7. A device for facilitating the testing of the tightness of fit of a gas mask having a tubular respiratory air inlet and an exhaling air outlet comprising a tubular valve housing and which is applied over the face of a wearer's head, comprising a bag-like headpiece engageable over the wearer's head with the gas mask already positioned on the wearer's head and having a first opening for the wearer's neck and a second opening for the tubular air inlet of the mask, and means on said headpiece around said first and second openings for tightly engaging the respective neck and tubular air inlet, means for directing a testing gas into the space between said headpiece and said mask, a tubular exhaling air connection means mounted on said headpiece of a size to engage over the tubular valve housing and be sealed therewith and having a bottom wall with a passage therein for receiving the exhaled air from the tubular exhaling air outlet.

* * * * *